United States Patent Office 3,093,643
Patented June 11, 1963

3,093,643
STABILIZED DINITROSOPENTAMETHYLENE-
TETRAMINE COMPOSITIONS AND PROC-
ESSES FOR THEIR PRODUCTION
Kurt Vohwinkel, Leverkusen and Paul Stöcklin, Opladen, Germany, assignors to Farbenfabriken Bayer Aktiengesellschaft, Leverkusen, Germany, a corporation of Germany
No Drawing. Filed Aug. 23, 1960, Ser. No. 51,283
Claims priority, application Germany Aug. 27, 1959
10 Claims. (Cl. 260—248)

This invention relates to the stabilization of dinitrosopentamethylenetetramine.

It is known that dinitrosopentamethylenetetramine is widely used as a blowing agent, especially for natural and synthetic elastomers. It is also known that the use of this compound does however present difficulties, since it ignites very easily and then burns at very high velocity. Dinitrosopentamethylenetetramine is likewise decomposed by small quantities of a mineral acid or by organic acids, such as for example, benzoic or salicylic acids. Since the said organic acids are employed in the processing of natural and synthetic elastomers, for example, as activators for blowing agents or as vulcanization retarders, these acids can lead, in the presence of dinitrosopentamethylenetetramine to breakdowns caused by sudden decomposition with the evolution of smoke and possible detonation. Furthermore the great sensitivity of this compound to acid necessitates additional measures being taken during the transport and storage of this compound. In order to avoid these disadvantgaes, dinitrosopentamethylenetetramine has consequently been marketed in a very dilute form (for example, about 40%). However, such great dilution is undesirable in many cases.

On the other hand, it is not possible to employ for the stabilization of dinitrosopentamethylenetetramine, compounds which are normally employed for reducing the combustibility of organic compounds, such as, for example, tricresyl phosphate or chlorinated aliphatic or aromatic compounds, since these compounds greatly reduce the storability of the dinitrosopentamethylenetetramine.

It has now been found that dinitrosopentamethylenetetramine can be stabilized by adding to it a salt of a weak organic acid and a fatty acid ester of a hydroxyalkylamine, preferably in admixture with an inorganic salt or compound which splits off or releases or liberates water at an elevated temperature.

Fatty acid esters of hydroxyalkylamines which, in the form of salts with organic acids, are suitable for use in stabilizing dinitrosopentamethylenetetramine in accordance with this invention are, for example, the esters of fatty acids, preferably esters of fatty acids which contain 8 to 20 carbon atoms, such as stearic, lauric, oleic, palmitic and paraffin fatty acids with hydroxyalkylamines which contain preferably up to about 12 carbon atoms, such as, for example, hydroxyethylated diethylenetriamine and triethylenetetramine. The weak organic acids are preferably those having a pK-value of about 3.7 to 6. Examples of these acids are acetic acid, formic acid, propionic acid, n-heptylic acid (n-heptanoic acid), vinylacetic acid, adipic acid, azelaic acid, benzoic acid, and p-hydroxybenzoic acid. Preferably one uses aliphatic mono- and dicarboxylic acids. Especially suitable are the acetates of the fatty acid esters of hydroxyalkylamines. The stabilizers used in accordance with this invention are cation-active compounds and their addition causes a distinct improvement in the electrical conductivity. In this way, danger of electrostatic charging during packing, storage or handling of the material in insulating containers, such as, for example, polyethylene bags, is reduced.

Examples of the inorganic compounds which split off water at elevated temperatures are alkali-metal phosphates, aluminum hydroxides, barium chloride dihydrate ($BaCl_2 \cdot 2H_2O$), calcium sulfate dihydrate ($CaSO_4 \cdot 2H_2O$), and magnesium ammonium phosphate hexahydrate ($MgNH_4PO_4 \cdot 6H_2O$) which contain water of crystallization or physically combined water and which give off this water at somewhat elevated temperatures, such as those used when processing natural and synthetic elastomers, for example, in the range between 60 and approximately 200° C. The salts of the fatty acid esters of hydroxyalkylamines are preferably added to the dinitrosopentamethylenetetramine in quantities from 5 to 30% by weight. Some of this fatty acid ester of the hydroxyalkylamine can be replaced by the inorganic compound, but the stabilized dinitrosopentamethylenetetramine mixture should however contain at least approximately 3% by weight of the salt of the fatty acid ester.

The stabilized dinitrosopentamethylenetetramine mixture can also contain compounds which prevent an undesirable dust formation of these mixtures. Such compounds are, for example, non-volatile plasticizers which do not have an acid reaction and do not split off any acid constituents at elevated temperatures, or, for example, polyesters such as those obtained by conventional processes from aliphatic dicarboxylic acids with, for example, 3 to 8 carbon atoms, aliphatic diols together with and a small quantity of a polyfunctional compound, or polyethers, such as, for example, aliphatic polyethers with a molecular weight higher than approximately 500, which have no disturbing effect during the processing of the natural and synthetic elastomers, for example, neither retard nor accelerate the vulcanization velocity of the rubber mixtures. These compounds can be contained in the stabilized dinitrosopentamethylenetetramine mixtures in quantities of, for example, up to 20% by weight.

The dinitrosopentamethylenetetramine mixtures stabilized according to the invention can be of very high percentage, for example, from 75 to 95%, and have a very good resistance to acid and a low inflammability.

A preferred method for the preparation of dinitrosopentamethylenetetramine and examples of stabilized compositions containing dinitrosopentamethylenetetramine, which are preferred embodiments of the products and processes of the present invention, are included in the description which follows hereinafter.

*Example 1*

(a) Moist dinitrosopentamethylenetetramine (82 parts, related to the dry substance) is ground with 10 parts of a 50% aqueous paste of the neutral acetate of a stearic acid ester of a hydroxyethylated mixture of diethylenetriamine and triethylenetetramine prepared as specified hereinafter, 9 parts of aluminum hydroxide and 4 parts of polyisobutylene (molecular weight 3,000) and then dried. Instead of the aluminum hydroxide there can also be used equal amounts of (b) $BaCl_2 \cdot 2H_2O$
(c) $MgNH_4PO_4 \cdot 6H_2O$ or
(d) $CaSO_4 \cdot 2H_2O$ or
(e) The foregoing salts (as well as the aluminum hydroxide) can be omitted.

The hydroxyethylated mixture of dimethylenetriamine and triethylenetetramine from which the neutral acetate of the stearic acid ester of the hydroxyethylated mixture of diethylenetriamine and triethylenetetramine was prepared was obtained as follows:

146 parts by weight of a mixture of diethylenetriamine and triethylenetetramine are treated at 100° C. with 320 parts by weight of ethylene oxide. 100 parts of this hydroxyethylated mixture of polyethylenepolyamines is treated for three hours at 180–185° C. with 100 parts by weight of stearic acid thus forming an ester.

*Example 2*

Moist dinitrosopentamethylenetetramine (94 parts, related to the dry substance) is ground with 8 parts of a 50% aqueous paste of the neutral acetate of the stearic acid ester of the hydroxyethylated mixture of diethylenetriamine and triethylenetetramine whose preparation was described hereinbefore in example 1, and 2 parts of aluminum hydroxide, and thereafter dried.

*Example 3*

Moist dinitrosopentamethylenetetramine (80 parts, related to the dry substance) is ground with 10 parts of a 50% aqueous paste of the neutrally reacting acetate of triethanolamine monostearate, prepared in conventional manner, 11 parts of aluminum hydroxide and 4 parts of polyisobutylene (molecular weight about 3,000) and thereafter dried. Instead of the triethanolamine monostearate there can be used equal amounts of the neutrally reacting acetate of stearic acid diethanolamide or the neutrally reacting acetate of the bis-stearic acid ester of dihydroxytetraethylene triamine.

*Example 4*

The compositions prepared as described hereinbefore in Examples 1a to 1e are compared in their properties with a dinitrosopentamethylenetetramine obtained according to conventional methods. In the table hereinafter are described under column A the results produced when 1 gram of the composition is treated with 20% hydrochloric acid and under column B the combustibility of the products after ignition with a flame from a burning match.

| Product | A | B |
| --- | --- | --- |
| 1a | After 10 drops of acid, only slight formation of foam on the surface. | Quiet, slow burning. |
| 1b | The same as 1a | The same as 1a. |
| 1c | ----do---- | Do. |
| 1d | ----do---- | Do. |
| Not stabilized dinitrosopentamethylene tetramine. | After adding 1 drop of acid, ignited and burned. | Darting flame. |

A preferred method for the preparation of dinitrosopentamethylenetetramine is as follows:

Ninety (90) grams of hexamethylene tetramine are dissolved in 180 ml. of water. To this a solution is then added of 90 grams of sodium nitrite dissolved in 180 ml. of water. To this mixture 525 ml. of a 7.5% hydrochloric acid are added dropwise while cooling. The resulting precipitate of dinitrosopentamethylene tetramine is filtered off and dried.

We claim:

1. A composition consisting essentially of dinitrosopentamethylenetetramine containing, as a stabilizing agent therefor, a salt of a weak organic acid and a fatty acid ester of a hydroxyalkylamine the alkyl radical of which contains up to 12 carbon atoms, in an amount of at least 3 percent by weight of the composition.

2. A composition consisting essentially of dinitrosopentamethylenetetramine containing, as a stabilizing agent therefor, a salt of the group consisting of the acetates of (*a*) the stearic acid esters of hydroxyethylated mixtures of diethylenetriamine and triethylenetetramine, (*b*) triethanolamine stearate, (*c*) stearic acid diethanolamide, and (*d*) the bis-stearic acid ester of dihydroxytetraethylenetriamine, in an amount of at least 3 percent by weight of the composition.

3. A composition as defined in claim 1 in which the stabilizing agent is a neutral acetate of a stearic acid ester of a hydroxyethylated mixture of diethylenetriamine and triethylenetetramine.

4. A composition as defined in claim 1 in which the stabilizing agent is the acetate of triethanolamine stearate.

5. A composition as defined in claim 1 in which the stabilizing agent is the acetate of stearic acid diethanolamide.

6. A composition as defined in claim 1 in which the stabilizing agent is the acetate of the bis-stearic acid ester of dihydroxytetraethylenetriamine.

7. A composition consisting essentially of dinitrosopentamethylenetetramine containing, as a stabilizing agent therefor, the acetate of triethanolamine monostearate in amount between 5 and 30 percent by weight of the composition.

8. A composition as defined in claim 1 in which is also included an inorganic compound containing combined water that is capable of being released at a temperature between 60° and 200° C.

9. A composition as defined in claim 1 in which is also included an inorganic compound containing combined water of the group consisting of hydrated alkali-metal phosphates, hydrated aluminum hydroxides, barium chloride dihydrate, calcium sulfate dihydrate, and magnesium ammonium phosphate hexahydrate.

10. A process for the stabilization of a composition consisting essentially of dinitrosopentamethylenetetramine which comprises adding thereto at least 3 percent by weight of a salt of a weak inorganic acid and a fatty acid ester of a hydroxyalkylamine, the alkyl radical of which contains up to 12 carbon atoms.

References Cited in the file of this patent

Chemical Abstracts, volume 53, columns 1802–3 (1959).